(No Model.)
O. C. CHRISTIN.
STEAM FOOD COOKER.
No. 432,863.          Patented July 22, 1890.
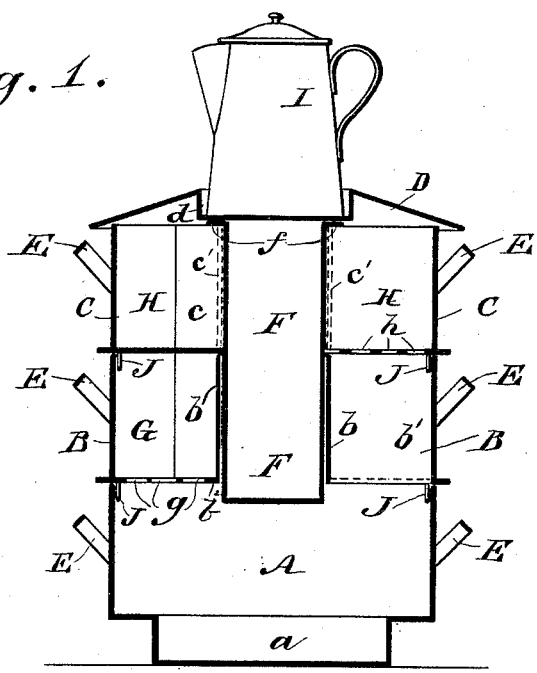
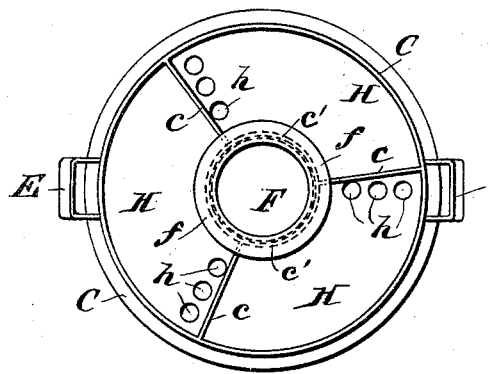
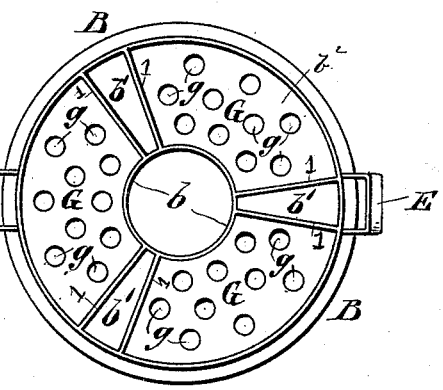
WITNESSES:
INVENTOR:
O. C. Christin
BY
Munn & Co.
ATTORNEYS

\# UNITED STATES PATENT OFFICE.

OLIVE C. CHRISTIN, OF BODIE, CALIFORNIA.

STEAM FOOD-COOKER.

SPECIFICATION forming part of Letters Patent No. 432,863, dated July 22, 1890.

Application filed April 12, 1890. Serial No. 347,593. (No model.)

*To all whom it may concern:*

Be it known that I, OLIVE C. CHRISTIN, of Bodie, in the county of Mono and State of California, have invented a new and Improved Steam Food-Cooker, of which the following is a full, clear, and exact description.

My invention relates to food cookers or steamers, and has for its object to provide a simple, inexpensive, and efficient apparatus of this character which will cook several different kinds of edibles at once without giving one the flavor of the other, and with economy of time, space, labor, and fuel.

The invention consists in certain novel features of construction and combinations of parts of the food-cooker, all as hereinafter described and claimed.

Reference is to be had to the accompanying drawings, forming a part of this specification, in which similar letters of reference indicate corresponding parts in all the figures.

Figure 1 is a vertical sectional view of my improved steam food-cooker with a coffee-pot shown thereon in side elevation. Fig. 2 is a plan view of the top cooking-vessel of the apparatus with its cover removed, and Fig. 3 is a plan view of the central or intermediate cooking-vessel.

In its preferred form my improved steam food-cooker has three sections or vessels, separable one from the other, and comprising a lower or bottom vessel or boiler A, intended to hold water, and to set upon a stove or heater or within a lid-hole thereof; a center section or vessel B, resting on the one A, and an upper vessel or section C, resting on the one B, and provided with a removable cover D, which really serves as a cover to all three vessels, as the two upper vessels have steam communication with the lower one, as presently described. Each vessel or section A B C is provided with a pair of handles E E, allowing the entire cooker or both or either of the two upper vessels to be removed or carried at pleasure. The lower vessel A preferably has a cylindrical general form, and is provided with a pit or pendent center bottom portion $a$, adapted to enter a stove-top hole, and is intended to receive water to be boiled therein for generating steam which rises to cook food in the upper vessels B C, or for providing hot water for household or other purposes.

The center or intermediate vessel or cooker section B is provided with a central wall or partition $b$, which is preferably cylindrical and is intended to receive the lower portion of a soup or liquid cooking compartment F, which extends downward from the upper cooker-section C, as hereinafter more fully explained. The vessel or section B is also provided with one or more, preferably three, vertical passages $b'$ $b'$ $b'$, each formed by two partitions $l$ $l$, (shown best in Fig. 3 of the drawings,) extending from the bottom $b^2$ of the vessel to its top, and said bottom $b^2$ is perforated between these vertical passages, as many of which are formed as will divide the vessel B into any preferred number of cooking-compartments between the central opening formed by the partition $b$ and the outer wall of the vessel. In the example shown I provide the vessel B with three separate compartments G G G, each having a bottom perforated at $g$, which allows steam to pass directly into them from the lower boiler or generator-vessel A, from which steam rises also through the passage $b'$ to the upper vessel C. This upper cooking vessel or section C supports the soup-vessel F, above mentioned, and when the vessel or section B has three compartments G the vessel or section C will also have three separate cooking-compartments H H H, formed by radial partitions $c$, extending between the soup-vessel F and the outer wall of the section when the vessel F is fixed to said section, as shown in Fig. 1 of the drawings; but when the soup-vessel is made separately from the section C to lift from it the partitions $c$ will extend from a central wall or partition $c'$, within which the vessel F will fit loosely, and as indicated by the dotted lines in Figs. 1 and 2 of the drawings.

The bottoms of the compartments H of the upper cooker section or vessel C are imperforate over the cooking-compartments G of the next lower vessel B to form covers thereto; but at points directly over the vertical passage or passages $b'$ in the vessel B the bottoms of the compartments H of the vessel C are perforated at $h$ to allow the steam rising from the boiler A through the passages $b'$ to enter the compartments H through the openings $h$ and without passing through the cooking-compartments G of the intermediate cooking vessel or section B, which receive steam directly through their bottom openings g from the main boiler A.

The cover D of the cooker is adapted to fit the top of the upper cooking vessel or section C, and has at its central part a depressed portion d, which normally rests on the top flange of the soup-vessel F to close it, and provides a safe support or rest for a coffee or tea pot or other heating or cooking vessel I at the top of the apparatus, as shown in Fig. 1 of the drawings.

Any suitable stops or flange-detents J will be provided to steady the vessels B C on the boiler A, or on each other, and these detents will be so arranged that when the top vessel or section C is placed on the vessel or section B the openings h of the vessel C will register with the steam-passages b' through the vessel B.

It is manifest that when the cooking apparatus is placed over a fire in a coal, gas, or gasoline stove or heater and the vessel or boiler A is charged with water the steam evolved will rise directly through the openings g into the compartments G of the middle vessel or section B to cook two kinds of vegetables and meat or fowl placed therein, and the steam will also rise from the boiler A, through the passages b' of section B and the openings h, into the compartments H of the upper section C, to cook fish, cauliflower, pudding, or other edibles therein, while soup is being cooked in the other vessel or compartment F, which passes down through both vessels C B toward or into the boiler A, and at the same time coffee or tea may be steeped or made in the vessel I on the top or cover of the apparatus. An entire meal of several courses or varieties of food may thus be cooked at once in my improved apparatus and with economy of time, labor, and fuel, and the odor of the various substances cannot pass to or mingle with the other substances being cooked, so that each well-cooked substance will have its own distinctive flavor.

Having thus described my invention, I claim as new and desire to secure by Letters Patent—

1. In a food-cooker, the combination of two cooking-vessels, the lower one provided with an inner passage and one or more outer cooking-compartments having perforate bottoms, and also having independent through-and-through passages for a heating medium, and the upper vessel having a pendent cooking-compartment entering the inner passage of the lower vessel, said upper vessel also provided outside or next the pendent cooking-compartment with one or more compartments perforated at the bottom to communicate only with the independent through-and-through heat medium passages of the lower vessel, substantially as described.

2. In a food-cooker, the combination, with a lower steam boiler or vessel, of two superposed cooking-vessels resting on the boiler and each other, the middle vessel having an inner passage and the upper vessel having a pendent cooking-compartment entering this passage and outer cooking-compartments next the pendent compartment and having perforate bottoms, said middle vessel also having perforations in its bottom to admit steam directly from the boiler into its cooking-compartments, and provided also with independent through-and-through passages admitting steam from the boiler to the cooking-compartments of the upper vessel through their perforate bottoms, substantially as herein set forth.

3. In a food-cooker, the combination, with a lower boiler or vessel, of two superposed cooking-vessels B C, the middle vessel B having a central opening and compartments G, having bottom perforations g, and also having steam-passages b', and the upper vessel C provided with compartments H, having bottom-openings h, registering with the passages b', and a cooking-compartment F, held by the vessel C and entering the opening b of the vessel B, substantially as described.

OLIVE C. CHRISTIN.

Witnesses:
M. MARKS,
F. A. HAZARD.